Jan. 4, 1938.    G. R. GREENSLADE    2,104,644
METHOD OF TESTING AND APPARATUS THEREFOR
Filed May 31, 1935    4 Sheets-Sheet 1

Inventor:
Grover R. Greenslade
By Frank H. Wisch
Attorney

Jan. 4, 1938.   G. R. GREENSLADE   2,104,644
METHOD OF TESTING AND APPARATUS THEREFOR
Filed May 31, 1935   4 Sheets-Sheet 2

Jan. 4, 1938.  G. R. GREENSLADE  2,104,644
METHOD OF TESTING AND APPARATUS THEREFOR
Filed May 31, 1935  4 Sheets-Sheet 3

Jan. 4, 1938.  G. R. GREENSLADE  2,104,644
METHOD OF TESTING AND APPARATUS THEREFOR
Filed May 31, 1935  4 Sheets-Sheet 4

FIG. 12.

Inventor:
Grover R. Greenslade
By Frank H. Wisch
Attorney

Patented Jan. 4, 1938

2,104,644

UNITED STATES PATENT OFFICE 2,104,644

METHODS OF TESTING AND APPARATUS THEREFOR

Grover R. Greenslade, Scott Township, Allegheny County, Pa., assignor to Pittsburgh Dry Stencil Company, a corporation of Pennsylvania Application May 31, 1935, Serial No. 24,403

32 Claims. (Cl. 175—183)

This invention relates to improvements in apparatus for and methods of testing metal objects to determine the condition thereof. More particularly the invention relates to testing of metallic objects having passageways therein, by the insertion of electrical means in said passageways to determine the presence or absence of fractures in such objects.

Heretofore various types of instruments have been invented and used for testing or inspecting staybolts for instance. Some of these instruments have served merely to indicate the condition of a telltale hole of a telltale staybolt. Others have served merely as means for determining whether or not a bolt is broken or fractured. In my copending applications Serial No. 742,656, filed September 4, 1934, and Serial No. 757,378, filed December 13, 1934, I have disclosed instruments in which there are effectively combined, means that serve both to indicate the condition of a telltale hole of a telltale staybolt as well as the condition of the staybolt itself.

In the above-mentioned copending applications, I have shown and described testing implements whereby the condition of a bolt is determined by means of electromagnetic induction. In both instances, the instruments comprise an exploring rod associated with means in which current is induced by a magnetic flux of alternating polarity. As one example of the source of the flux, is shown an electromagnet applied so as to set up electromagnetic disturbances in the object to be tested. Variations in the magnitude of the induced current are noted by indicator means by which the presence or absence of fractures or other irregularities in a metal object are determined. An electromagnetic energizing device must be separately applied and an electromagnet used for this purpose must be of considerable bulk.

The present invention, although it includes means, the operation of which is based on electromagnetic principles, requires no such supplementary apparatus, inasmuch as the testing implement itself contains all of the necessary energizing means. As will be seen, the present invention is simple in construction and easy to operate in that no auxiliary apparatus or equipment is necessary. It comprises means whereby the condition of every breakable portion of a bolt, for instance, may be determined or in other words every part of a bolt that renders it effective as a stay for the opposite plates of a boiler. An instrument is provided with means insertable and movable in a telltale hole of a telltale staybolt which means include energizing means and means for conducting current induced by the said energizing means to indicating means whereby an operator can detect the presence of irregularities or defects in the bolt. In combination with the aforesaid energizing means, the present invention includes electrical contact means which serves as a magnetic core for the energizing means and which serves to complete an electric circuit through an electrical indicator by positive engagement with the original closed end of the telltale hole of a telltale staybolt. As to this latter feature the present invention is therefore distinct from the invention set forth in application Serial No. 757,379, filed December 13, 1934, in which electromagnetic means are employed for determining the condition of the telltale hole of a bolt as well as the condition of the bolt itself.

The present invention is particularly adapted to testing of staybolts. It may be used in testing hollow crank pins and hollow axles or for testing any ferrous means having tubular or other passageways therein and portions thereof that are not readily accessible.

Advantages in the use of the instrument will be apparent, and the construction thereof will be understood from the detailed description that follows and from the illustrated examples given in the accompanying drawings, in which.

Figure 1:
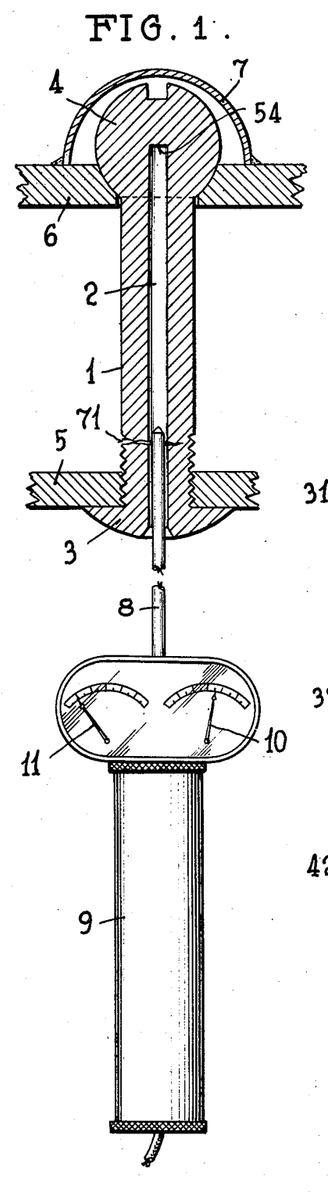
Figure 1 is a view showing one modification of a testing instrument in side elevation and the manner in which it is employed in testing a telltale staybolt, the staybolt being shown in section.

Referring to Figure 1, one form of my device is shown in use for ascertaining the condition of a telltale staybolt 1. The latter is provided with a telltale hole 2 that extends axially from the riveted end 3 into but not through the headed end 4. The bolt shown is of a flexible type and is associated with the inner or firebox sheet 5 and the outer or wrapper sheet 6 of a locomotive boiler. A cap 7 encloses the head 4 and is welded to the sheet 6.

The testing instrument comprises an exploring rod 8 adapted to be inserted in a telltale hole of a staybolt, a handle 9 to which the exploring rod is rigidly attached, indicating means 10 for determining whether or not a bolt is fractured, and additional indicating means 11 for determining whether or not the telltale hole is open substantially its entire length. The specific arrangement of the device shown in Figure 1 will be described below in connection with Figures 4 and 5.

Figures 2, 3:
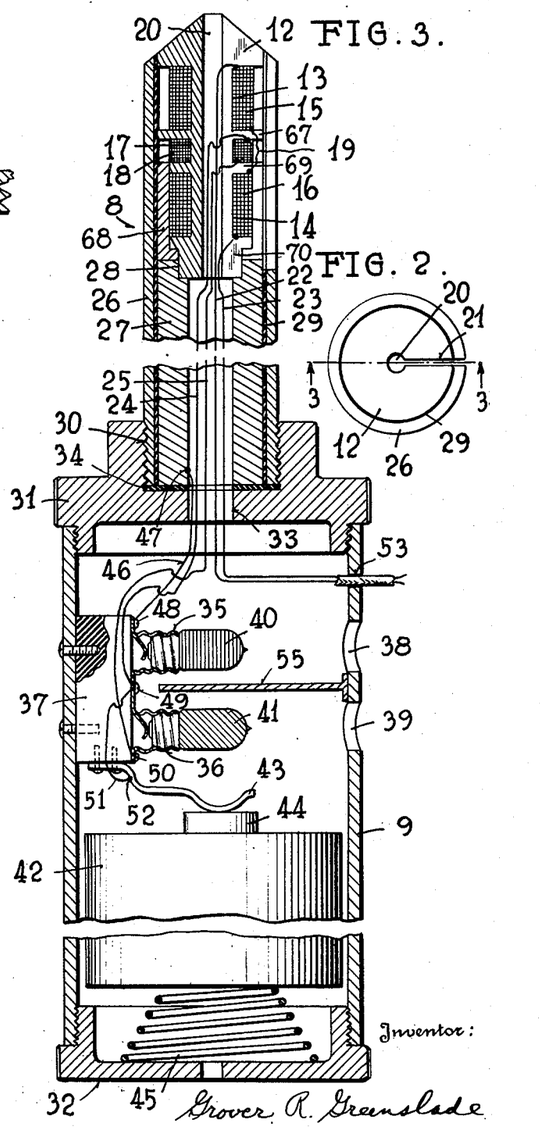
Figure 2 is an enlarged end view of the free end of a testing rod shown in Figure 3.
Figure 3 is a view on line 3—3 of Figure 2 showing an enlarged longitudinal section of an additional modification of a testing implement.

The construction of the implement shown in Figures 2 and 3, is described as follows: An exploring rod 8 attached to a handle 9 is shown provided with a contact tip 12 positioned in the free end of the rod 8. The contact tip 12 includes an outer end portion, preferably tapered, and protruding a short distance from the free end of the rod; and an inner portion provided with grooves otherwise designated as spool sections for electric windings.

One form of contact tip is shown in Figure 3. Other forms are possible, however, as will be seen below. Ferrous or magnetic metal suitable for magnetization purposes is employed in the construction of a contact tip. The contact tip 12 comprising a single member is provided with grooves 13 and 14 in which energizing coils 15 and 16 are wound, and a groove 17 in which a detector coil 18 is wound.

The energizing coils 15 and 16 are electrically matched and opposed or oppositely mounted. The coil 15, for instance, may be a left-hand winding, and the coil 16 a right-hand winding. The number of turns in each of these windings is such that they provide opposed magnetic fields which under normal conditions are balanced one against the other so that a zone between the coils 15 and 16 is magnetically neutral. These coils are connected in series by a wire 19 joining the outer ends of the said coils.

The detector coil 18 in the groove 17, positioned in the neutral zone between the coils 15 and 16, is independent of the energizing coils and is in a separate circuit as described below.

The contact tip 12 is provided with a central passageway 20 and a slot 21 (Fig. 2) which extends radially from the said passageway. Lead wires connected to the coils pass through the slot 21 and the passageway 20, and through the rod 8 to the handle 9. The inner ends of coils 15 and 16 are connected to lead wires 22 and 23, and the ends of the coil 18 are connected to lead wires 24 and 25.

The exploring rod 8 comprises an outer tubular member 26 and an inner tubular member 27.

Both of these members may be constructed of brass. The tubular member 26 serves to minimize the effect of induced current in the object under test. The inner tubular member 27 serves as a conduit for the lead wires. By soldering it at 28 to the contact tip 12, the member 27, before insertion in the tubular member 26, serves also as a handle for holding the tip while the various coils are being wound. The member 27 furthermore maintains the tip 12 rigidly in place in the exploring rod by which the tip is adapted to be moved in a telltale hole of a bolt for instance. The outer tubular member 26 is insulated from the tip 12 and from the member 27 by suitable insulation material 29.

The outer tubular member 26 is provided with a screw thread 30 by which attachment is made to the tubular handle 9. The ends of the handle 9 are provided with screw caps 31 and 32. The cap 31 is provided with a center passage 33 having a counterbore into which the rod 8 is screwed. The passage 33 coincides in diameter with that of the bore of the tubular member 27. The end of the member 27 is insulated from the cap 31 by insulating material 34.

Within the hollow handle 9, lamp sockets 35 and 36 are mounted on an insulating block 37 affixed so that the sockets are positioned opposite openings 38 and 39 respectively. Lamps 40 and 41 are screwed into the sockets 35 and 36 respectively and are included in separate electric circuits to be described below.

A dry battery 42 is housed within the handle 9 and is of the well known type having a terminal at both ends. A spring contact member 43 suitably supported as for instance by attachment to the insulating block 37, is shown in electrical contact with one terminal 44 of the battery 42. The other terminal of the battery is engaged by a spring 45 positioned between the cap 32 and the said terminal. The spring 45 tends to maintain contact between the battery and the cap 32 and to move the battery forwardly whereby a good electrical contact between the terminal 44 and the contact member 43 is maintained. One battery or a plurality of batteries may be employed.

With reference to the wiring for the separate light circuits, a wire 46 having one end soldered to the inner tubular member 27 as at 47 is connected by its other end to one of the terminals 48 of the socket 35. The lead wires 24 and 25 from the detector coil 18 are connected to the terminals 49 and 50 respectively. The terminal 49 serves as a common terminal for both sockets 35 and 36. A wire 51 for connecting the light 40 to the battery 42, is connected at one end to the terminal 49 and its other end is soldered to the contact member 43 as at 52.

The lead wires 22 and 23 for the energizing coils 15 and 16 extend into the handle 9 and out through an opening 53 to an interrupter or suitable alternating current source (not shown).

The above wiring including the wire in the coils, is insulated throughout, and is of any desirable gage.

The manner of using the testing implement to determine the condition of a metal object such as a telltale staybolt for instance, is as follows:—The alternating current is turned on in the energizing coils 15 and 16. The rod 8 is inserted in the telltale hole of a telltale staybolt as shown in Fig. 1 and while moving it inwardly, the operator watches the lamp 41 through the opening 39. If it lights, this is an indication that the bolt has a fracture in it. If the lamp 41 remains unlit while moving the rod 8 to the inner closed end 54 of the telltale hole 2, this is an indication that there are no fractures and that the bolt is therefore in good condition.

When the tip 12 of the rod 8 touches the original closed end 54 of the telltale hole 2, the lamp 40 lights thereby indicating that the telltale hole is free from obstructions. When the lamp 40 is thus lighted the course taken by the current in the circuit in which the lamp 40 is included may be traced from the terminal 44 of the battery 42 successively through the contact spring 43, the wire 51 to the terminal 49, the socket 35, the outer contact of the lamp 40, the filament of this lamp, the central contact of the lamp, the spring contact means connected to the terminal 48, the wire 46, the inner tubular member 27, the contact tip 12, the bolt being tested to the outer tubular member 26 at the point of contact therewith, the tubular member 26, the cap 31, the handle 9, the cap 32, the spring 45 to the other terminal of the battery 42. The outer end of the contact tip 12 is tapered so that, when the implement is inserted into the telltale hole, the tip cannot come into engagement with the side walls of the telltale hole.

Obstructions in telltale holes of boiler staybolts are caused generally by sediment left by the evaporation of boiler water that seeps into the telltale hole of a bolt when the latter is fractured. The sediment clogs up the passage and frequently becomes as hard as cement. If a considerable portion of the passage is clogged up it is readily seen that a test cannot be said to be complete until the sediment is removed and the bolt tested for fractures along the entire length of the telltale hole. So long as there is any sediment, rust, or other nonconducting corrosion in the telltale hole that prevents the tip 12 from touching the end 54 of the telltale hole, the lamp 40 will not light. When this condition arises, the sediment is removed with a drill, and the rod 8 inserted until the lamp 40 indicates by its light that the telltale hole has been cleaned out. The portion of the telltale hole that was clogged up must then be explored to determine the presence or absence of fractures by means of the lamp 41. The lamps 40 and 41 may be of different colors, as for instance red and green respectively. A partition 55 may be provided between the lamps so that the light from only one of them and not the other may be seen through each of the openings 38 and 39.

Figures 4, 5, 6, 7:
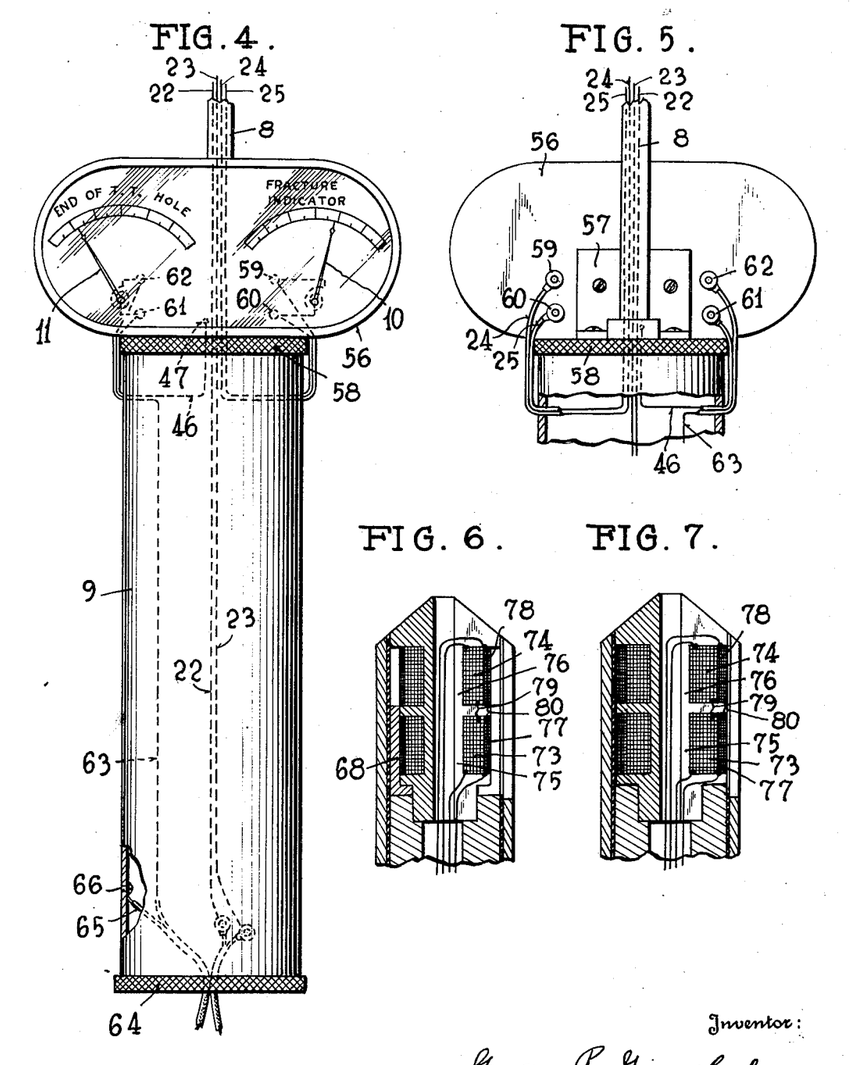
Figure 4 is a view, partly in section and partly in elevation, of a portion of a testing implement, showing a modified arrangement of parts in the handle of said implement.
Figure 5 is a fragmentary view, partly in section and partly in elevation, of the implement shown in Figure 4, illustrating one manner in which an indicating device is mounted on the handle of the implement.
Figures 6 and 7 are enlarged, longitudinal sectional views of modifications of the free end of a testing rod.

As seen in Figs. 4 and 5 other types of indicators may be employed in place of lamps. For instance, microammeters may be used to indicate the presence or absence of fractures as well as the presence or absence of nonconducting accumulations in a passage into which the testing rod is inserted for exploring purposes. As shown in Figs. 4 and 5, the ammeters may be embodied in a single casing 56 and mounted on the handle 9 by means of any suitable bracket 57 fastened to the removable cap 58. Assuming that the rod 8 in Fig. 4 is extended to include the contact tip 12 as illustrated in Fig. 3, the lead wires 24 and 25 from the fracture detector coil pass through an opening in the handle 9 and are connected to the terminals 59 and 60 respectively of the indicator 10. The wire 46, having one of its ends 47 soldered to the inner tubular member 27 as shown in Fig. 3, and as shown in dotted lines in Fig. 4, passes through a second opening in the handle 9 and is connected to one of the terminals 61 of the indicator 11. The other terminal 62 of the indicator 11, is connected to one terminal of a source of current by means of a wire 63 passing through an opening in the removable cap 64 on the opposite end of the handle 9. A wire 65 connected to the other terminal of the said source of current is grounded on the handle 9 at 66. The lead wires 22 and 23 for the energizing coils 15 and 16, pass through the handle 9 to an alternating current source.

The courses of the currents in the circuit including the indicator 10 and in the circuit including the indicator 11, when the instrument shown in Figs. 4 and 5 is in use, can be readily understood from the description of the modification shown in Fig. 3.

Referring further to the operation of the instrument, the contact tip 12 being of high magnetic permeability serves as a core for the energizing coils 15 and 16 as well as a contact tip for determining whether or not the end of the telltale hole has been reached. With alternating current flowing through the opposed energizing coils, a magnetic flux of alternating polarity is created in the portion of the core around which the coil 15 is wound, which flux is at all times opposed to the flux created in the portion around which the coil 16 is wound. Normally, and when the rod is in the telltale hole of a flawless bolt, the magnetic lines of force generated by the coils link around the said coils. In the case of coil 15 the magnetic lines of force pass through the section 13, a flange 67, a portion of the bolt surrounding the coil 15 and through the outer end of the contact member or tip 12. For the reason to be explained below, a shield 68 of ferrous metal may be placed around the coil 16. The magnetic lines of force generated by the coil 16 will pass through the shield 68 more readily than through the bolt, and in addition through flange 69, section 14 and the inner end 70 of the contact member 12. As stated earlier in the description, the coil 18 is in a neutral zone and is not affected to any substantial extent by the magnetic lines of force under the conditions just set forth.

However, when the contact tip 12 is in the vicinity of a fracture 71 (as shown in Fig. 1) an unbalanced condition is brought about and this unbalanced condition becomes pronounced when the coil 15 is opposite the fracture. Due to the presence of the fracture, there is a partial break in the easy path of flow of magnetic lines of force in the field produced by the coil 15, which tends to weaken or decrease the magnetic strength of this field with the result that the magnetic field produced by the energizing coil 16 on account of its being somewhat less opposed than formerly will spread out so that some of the lines in the latter field will link through the flange 67 and thus encircle the detecting coil 18. The linking of these magnetic lines of force of alternating polarity around the coil 18 brings the latter within the field of the coil 16 and there is generated in the coil 18 an indicating current, whereupon the fracture indicator (the lamp 41 in the device shown in Fig. 3 and the ammeter needle 10 on the implement shown in Figs. 1 and 4) imparts a warning signal to the operator.

If the contact tip 12 is not provided with a shield 68 about the coil 16, and it need not be, two signals are given as the tip is moved past a fracture. One signal is all that is necessary for this purpose.

As seen in Figs. 6 and 7, other forms of contact tips may be substituted for the form shown in Fig. 3. The forms shown in Figs. 6 and 7 are particularly effective and simpler in construction, each being provided with only two spool sections in a single member instead of three. Opposed or oppositely mounted energizing coils 73 and 74 which are preferably matched are wound in the grooves or spool sections 75 and 76 respectively. The fracture detecting winding includes coils 77 and 78 which are wound on the outside of the opposed energizing coils in the grooves 75 and 76. The coils 77 and 78 are balanced but not opposed, in other words they are similarly mounted, the winding being in the same direction. The coils 73 and 74 are connected in series by a wire 79. The coils 77 and 78 are connected in series by a wire 80. The contact members shown in Figs. 6 and 7 differ from each other in that the spool section 75 in the contact member shown in Fig. 6 is provided with a shield 68 whereas in Fig. 7 the shield is omitted.

The electrical connections to the coils on the contact member shown in Figs. 6 and 7 are made in substantially the same manner as the connections to the corresponding coils on the contact member 12 in Fig. 3. In the use of a testing instrument equipped with a contact member such as either of those shown in Figs. 6 and 7, the impulses obtained in the detecting windings are in effect substantially similar to those obtained with the contact member 12 of Fig. 3 under similar conditions.

The slot provided in the contact tips and which extends through the outer tubular member of the exploring rod, serves to prevent heat formation and energy losses from eddy currents. The successful operation of the testing implement does not require the complete elimination of wasteful eddy currents but such elimination materially increases the electrical efficiency of the device.

It is readily seen that means are provided in the instrument whereby the contiguous portions of a metal object from within a passage-way therein are compared by the passage of the magnetic flux, and that the means requires no contact with the metal under test but is constructed to make comparisons independently of the distance thereof from the surface of the metal.

The modification shown in Figures 8 to 11 illustrates the application of means whereby the instrument may be used independently of any external power source. The construction of this modification will be understood from the following description: The means 81 is a tubular handle member for holding the exploring rod 82 and also for containing certain parts of the mechanism. The exploring rod is shown in part only and may be of any desired length provided in its free end with a contact tip of the types described above. A knurled closure 83 is provided with threads for screwing into the back end of the handle. A knurled closure or base member 84 is also provided with threads 85 for screwing into the front end of the tubular handle member 81. Within the cap or closure member 83, is a spring 86 for exerting pressure against the bottom of a battery 87 encased in the ordinary conventional cardboard insulating tube. The pressure of the spring 86 on the bottom terminal of the battery causes the other terminal 88 of the battery to make electrical contact with an iron base portion 89 of an induction coil.

The induction coil is enclosed in a cylindrical container of approximately the size of the battery 87. The base portion 89 as mentioned above, is of iron, while the cylindrical case 90 of the induction coil is of fibre which fits over the iron base and is attached to it. The other end of the cylindrical case 90 is closed by a heavy circular fibre board 91 which slips within the end of the case 90 and is removably secured thereto. Within this closed cylinder are housed all of the parts of the induction coil and interrupter mechanism. The cores 92 and 93 for the windings are of soft iron and are fitted securely into the iron base 89 as shown at 94 and 95 respectively. The primary winding 96 which takes current from the battery 87 is grounded to the base 89 as shown at 97. The current after passing through the coil 96 travels along the lead wire 98 and makes contact at 99, or any other convenient point, with the vibrating iron strip 100. This vibrating strip or armature is provided with the usual springlike contact member 101 which engages periodically the point of the contact screw 102 which is adjustably mounted in the conducting block 103. This conducting block is attached to a metal post 104, which is securely fastened to the iron base 89 or is integral therewith. The conducting block 103 is insulated from the post 104, by means of fibre discs 105 and 106 (Fig. 10) and fibre cylinders 107 and 108. The fibre cylinders prevent contact of the screws 109 and 110 with the post 104.

Figures 8, 9, 10, 11:
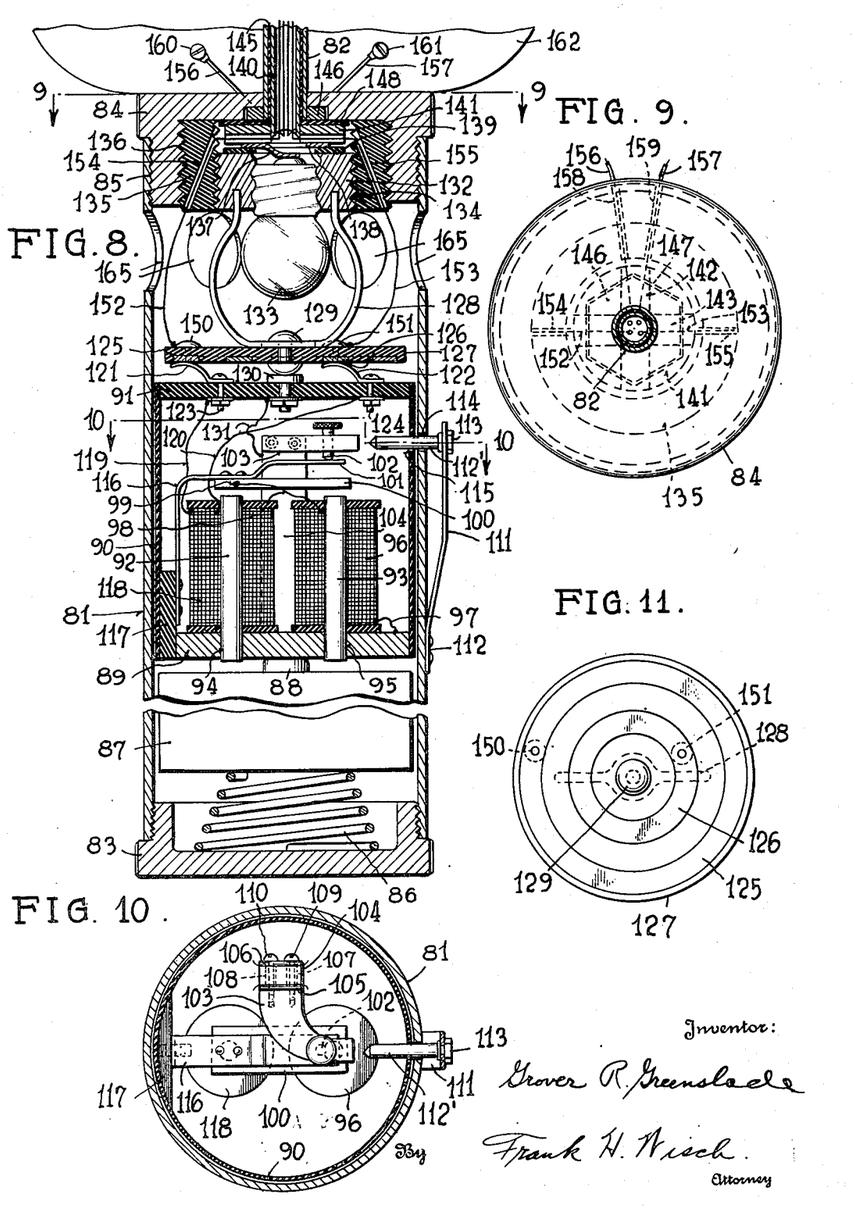
Figure 8 is a longitudinal sectional view of a testing implement showing further modifications of means employed in the implement.
Figure 9 is a view of Figure 8 taken on line 9—9.
Figure 10 is a view of Figure 8 taken on line 10—10.
Figure 11 is a plan view of means employed in the instrument illustrated in Figure 8.

The handle 81 is provided with a spring contact member 111 which is attached to the handle member as shown at 112. The spring contact member 111 is provided with a prong 112' which is secured to it, as shown, at 113 in any suitable manner. This prong 112' extends inwardly through an opening 114 in the handle 81 and through another opening 115 in the cylindrical fibre housing 90 of the induction coil. When the instrument is held in the hand and pressure is applied to the contact spring at 113 by means of the thumb, the prong 112' is pressed inwardly until it makes contact with the conducting block 103. It will be seen that this action closes the battery circuit through the terminal 88, the iron base 89 of the induction coil, the lead wire 97 of the primary winding of the induction coil, the primary winding 96 of the induction coil, the lead wire 98, the contact strip 101, the contact screw 102, the block 103, the prong 112', the spring 111, the metallic cylindrical handle 81, the metallic closure 83, the spring 86, and the base terminal of the battery 87.

When contact is made in this manner the movable iron strip 100, which is held in position by a spring member 116 which is attached to the base member 89 by an insulating member 117, will move by magnetic attraction toward the soft iron cores 92 and 93 of the induction coil until the electric circuit is broken by the recession of the contact strip 101 away from the contact screw 102. When this has taken place the force exerted by the spring 116 will again make contact and the process of making and breaking the circuit will continue as long as the operator presses upon the spring 111 at 113 with his thumb. It is this action which generates within the secondary coil 118 of the induction coil an intermittent current. As is seen, a mechanism ordinarily designated as an interrupter has been adapted for use in the testing implement.

The intermittent current generated in the secondary coil 118 is conveyed by means of the lead wires 119 and 120 to the contact springs 121 and 122 respectively by means of suitable screws 123 and 124 which pass through the insulating circular block 91. It will be observed that the two contact members 121 and 122 make contact at different distances from the axis of the mechanism. This is in order that the contact spring 121 may touch contact ring 125 and that contact spring 122 may touch contact ring 126. These contact rings are shown embedded in an insulating fibre disc 127 and arranged concentrically. The disc 127 is secured in position at right-angles to the axis of the handle by being attached to a brass stirrup 128 by means of a metallic rivet 129 which rivet also serves the purpose of making electrical contact between the stirrup 128 and a binding post 130 which passes through the center of the circular insulating block 91. A short lead wire 131 connects the binding post 130 to the post 104 and therefore to the iron base 89 of the induction coil and to the center terminal 88 of the dry battery 87. The further course of the current from the secondary coil 118 of the induction coil will be described later following the description of the various parts which complete the energizing circuit.

The metal stirrup 128 has its ends embedded in drilled holes in a metal socket member 132 and soldered in place. The socket member 132 is threaded internally to fit a flash-light bulb 133 and is threaded externally as shown at 134 so as to be screwed into a corresponding thread within an insulating fibre bushing 135.

The insulating fibre bushing 135 is likewise threaded externally so as to screw into the thread 136 of the metal base and closure member 84. When the lamp 133 is screwed into position, one of its contacts, namely, the outer threaded one, engages the socket member 132, and the other contact, namely, the central end one, engages a spring tongue 137 of a phosphor-bronze contact disc 138. It should be noted that electrical contact between the phosphor-bronze contact disc 138 and the socket member 132 is prevented by the placing between them of a fibre insulating washer 139. The purpose of the phosphor-bronze contact disc 138 with its spring tongue 137 is to establish electrical contact between the central end contact of the electric light bulb 133, and the brass inner tubular member 140 of the long exploring rod 82, corresponding to the inner tubular member 27 of the rod 8 shown in Fig. 3. The brass inner tubular member 140 terminates in a thrust member 141 which is a metallic disc provided with grooves 142 and 143 (Fig. 9) crossing at its central hole and extending to its periphery. The purpose of these grooves will be described later.

The inner brass tube 140 extends through the central hole of the disc 141 and is soldered thereto in position. The inner brass tube 140 within the outer brass tube 82 is insulated therefrom by means of, for instance, a thin woven silk or cotton insulation impregnated with a waxy compound. This woven insulation is indicated by numeral 145.

The outer brass tubular member 82 terminates within a hexagonal steel nut portion 146 to which it is soldered. The purpose of this hexagonal nut portion is that, when it is dropped into position within the hexagonal cavity 147 (Fig. 9) of the base closure 84 it will prevent relative rotation of the outer tubular member 82 with respect to the base closure member 84. When the inner tubular member 140 with its disc-like thrust member 141 is in place within the outer tubular member 82 and its hexagonal end 146, there is provided for insulating purposes not only the woven insulating material 145 but also the fibre washer 148 which lies between the disc member 141 and the hexagonal member 146. Therefore, when this particular group of parts is assembled as shown in Figure 8, the inner tubular member 140 is entirely insulated from the outer tubular member 82.

When all of the parts pertaining to the base closure member 84 are assembled as shown in Figure 8, the passage of electric current from the central terminal 88 of the battery with reference to the lamp circuit, is as follows: The electric current passes from the battery terminal 88 to the iron base 89 of the induction coil, thence in succession through the post 104, the lead wire 131, the binding post 130, the rivet 129, the stirrup 128, the brass socket member 132, the outer contact of the lamp 133, the filament of the lamp, the central contact of the lamp, the tongue 137 of the phosphor-bronze disc 138, the thrust disc 141 against which the disc 138 is pressed, and thence along the brass inner tubular member 140. Since the inner tubular member 140 is insulated throughout its entire length from the outer tubular member 82 by means of the insulation 145, the current follows the inner tubular member all the way to its end where it is secured to a grooved iron spool or contact tip as shown and described in connection with Fig. 3. Since the grooved iron spool is also insulated from the outer tubular member 82, the electric current follows along this spool to its pointed tip, where, as described above, it makes contact with the end wall of the hole or passage drilled along the axis of a bolt or other object to be tested so that the circuit is completed by passing of the electric current to the end wall of the passage and thence by contact of the outer brass tubular member 82 with the bore into which it has been inserted, back along the tubular member 82 to the base closure 84, and thence by means of the cylindrical handle 81, the end closure 83 and the spring 86 to the bottom terminal of the battery 87. The purpose and functioning of this particular electrical circuit has been described elsewhere herein.

The path of the intermittent current from the secondary coil 118 of the induction coil has in a previous part of this description been described as far as the contact rings 125 and 126 (Figs. 8 and 11). The path will now be continued from these points. The ring contact members 125 and 126 are provided with binding posts or terminals 150 and 151 which are attached to the respective rings and pass through the circular fibre insulator 127. On the side of the insulating disc 127, nearest to the lamp 133, the lead wires 152 and 153 from the energizing coils of the iron spool in the tip of the exploring rod 82, are connected to the binding posts 150 and 151. These lead wires 152 and 153 from the iron spool are insulated and extend along the hollow bore of the inner tubular member 140 through the thrust disc 141 and in opposite directions along the groove 143 to the ducts 154 and 155, respectively, which are bored through the insulating fibre bushing 135.

There are two other insulated lead wires 156 and 157 passing along the inner tubular member 140. These are the lead wires from the detecting coils which are wound on the spool at the tip of the rod, and which are described above. These extend along the bore of the tube, as shown, through the thrust disc 141 and along the groove 142 shown in Fig. 9 at right-angles to the groove which carries the lead wires 152 and 153. After emerging from the groove 142 at the periphery of the disc 141, the two detector lead wires pass through small holes 158 and 159 (Fig. 9) drilled through the fibre insulating bushing 135 and through the closure member 84 to the terminals 160 and 161 of the microammeter 162 (Fig. 8) attached to the closure 84.

In assembling the parts pertaining to the base closure 84 the insulating fibre bushing 135 is screwed firmly into position after which the holes 158 and 159 and the ducts 154 and 155 are drilled. This procedure positions these various holes correctly with respect to each other and with respect to the position of the grooves 142 and 143 in the disc 141 as determined by the seating of the hexagonal nut 146 within the hexagonal cavity 147 in the base closure 84. Before drilling the holes and ducts just described, it is necessary to place the exploring rod 82 in position by passing the rod through the hole in base 84 in a direction away from the position of the tubular handle 81. When the rod is pushed through as far as possible a slight rotation will allow the hexagonal nut 146 to drop into the recess 147, and the direction of the grooves 142 and 143 in the disc 141 will then determine the desirable position of the holes 158 and 159 and the ducts 154 and 155. After marking these positions, the rod and disc assemblage is removed, the holes drilled and the rod 82 and base 84 reassembled. The lead wires which extend out of the base of the tube 140 and through the disc 141, are passed through their respective passageways. When they are pressed carefully down within the grooves and are covered up with the phosphor-bronze contact disc 138, they are out of the way and protected from pressure. In completing the assembling of this portion of the apparatus, it is now necessary to place into position the fibre insulating washer 139, after which the lamp socket member 132, together with its stirrup 128 and the disc 127 which is attached to the stirrup, is screwed firmly into position within the fibre insulating bushing 135. The electric light 133 may now be screwed into its socket until it makes contact with the tongue 137 of the phosphur-bronze disc 138. The hollow cylindrical handle 81 of the implement is then screwed to the base closure 84. The meter 162 is now affixed to the end face of the base closure member 84 and the lead wires 156 and 157 are connected to the binding posts 160 and 161 respectively of the meter.

It is now very simple to complete the assembling of the apparatus. The cylindrical induction coil assemblage is pushed into the cylindrical handle from the rear end. The hole 115 in the fibre case of the induction coil unit is brought in line with the hole 114 in the tubular handle. As the forward end of the induction coil unit approaches the prong 112', the spring 111 is pulled outwards slightly with the fingers so as to allow the induction coil assemblage to pass in until the binding post 130 makes contact with rivet 129. The spring 111 is released and it should drop back in place. If it does not do this, the induction coil unit is rotated slightly in order to line up the two holes 114 and 115 perfectly. When this has been done the prong 112' will drop back to its natural position. The battery 87 and the spring 86 are now placed in position and the closure 83 screwed on. The apparatus is now ready for use. The purpose of the holes 165 in the cylindrical handle 81 are simply to make it easy for the operator to observe the electric light 133 from any angle.

As seen from the above description, there is provided a testing implement that is characterized by unity of construction, and that is compact and complete in itself, embodying the testing rod, electric circuits and indicating means. In order to test properly for defects in the body of the object under test by means of variations in the magnetic flux generated by the implement, the flux must penetrate a substantial distance into the metal object and beyond the wall of the passage-way through which the testing implement is passed.

Figure 12:
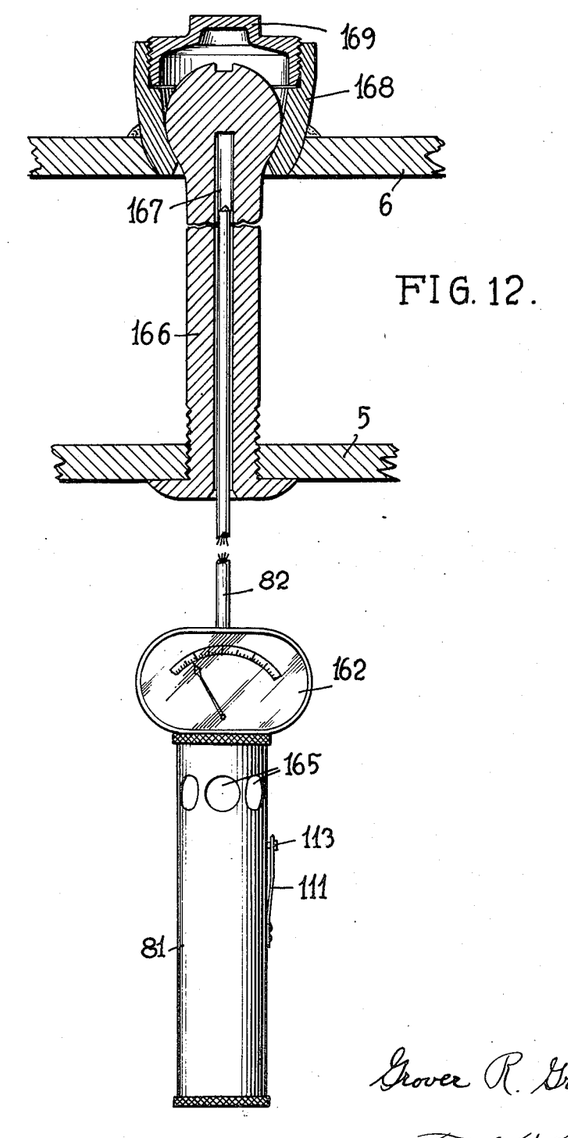
Figure 12 is a view showing a testing instrument in position for testing a staybolt of a modified type.

Any and all types of telltale staybolts, rigid or flexible, having a passage extending axially, partly or entirely therethrough, may be tested by means of the instruments described. The instruments are particularly adapted to testing the types of telltale bolts shown in Figures 1 and 12 including respectively a two-piece assemblage comprising the so-called large headed bolt 1 and the cap 7, and a three-piece assemblage comprising a so-called small headed bolt 166 provided with a telltale hole 167, a sleeve 168, and a cap 169. The cap in the first type of assemblage, and the cap and sleeve in the second type of assemblage are substantially closures for the headed ends of the bolts. The testing implement is brought into association with a bolt assemblage by introducing the testing rod into the telltale hole as shown.

It is to be understood that the drawings do not define the limits of the invention, as changes may be made in the construction and operation therein disclosed without departing from the spirit of the invention or scope of the appended claims.

I claim:—

1. Apparatus for testing the condition of a metal object having a passage-way into the body thereof, the said passage-way having an inner closed end, which apparatus comprises a testing implement adapted for insertion into the passage-way, means associated with said implement for indicating the presence or absence of fractures in said metal object while moving the said testing implement along the axis of said passage-way, and means associated with said implement for indicating whether it has reached the original closed end of said passage-way.

2. Apparatus for testing the condition of a metal object having a passage-way extending into the body thereof, which apparatus comprises an electric contact member adapted to be inserted into and moved in said passage-way, means combined with said contact member for inducing electric current and for generating a magnetic flux about said contact member, means for indicating variations in current induced, means for conducting induced current to said indicating means, and electrical indicating means associated with the said contact member for indicating whether said contact member has reached the original closed end of said passage-way.

3. Apparatus for testing the condition of a telltale staybolt, which apparatus comprises a tubular member adapted for insertion into the telltale hole of a telltale staybolt, an electric contact member mounted in and projecting from one end of said tubular member and insulated therefrom, means combined with said contact member for inducing electric current and for generating a magnetic flux about said contact member, means for indicating variations in current induced, means for conducting induced current to said indicating means, additional electrical indicating means, and means whereby an electric circuit through said latter indicator means is completed when said contact member reaches and makes contact with the original closed end of said telltale hole.

4. Apparatus for testing the condition of a telltale staybolt, which apparatus comprises a testing implement adapted for insertion into and movement along the telltale hole of a telltale staybolt, magnetic flux generating means combined with said implement, means associated therewith for determining the presence or absence of fractures in said staybolt, and means associated with said implement for indicating whether it has reached the original closed end of said telltale hole.

5. Apparatus for determining the condition of a metal object having a passage-way therein, which apparatus comprises means adapted to be inserted in said passage-way, the said means including means for inducing electric current, means for determining a variation in the current induced when in the vicinity of a fracture in said metal object, means for completing an electric circuit by contacting an original closed end of said passage-way with the end of the insertable means, and means for indicating when the circuit is broken or completed.

6. Apparatus for testing the condition of a metal object having a passage-way extending into the body thereof, which apparatus comprises a handle member, a testing member carried by said handle member and adapted for insertion and movement in said passageway, a contact member mounted on the free end of said testing member and insulated therefrom, means combined with said contact member for inducing electric current and for generating a magnetic flux about said contact member, means for indicating variations in current induced, additional indicating means, a battery, and means whereby an electric circuit through said latter indicating means and battery is completed when said contact member reaches and makes contact with the original closed end of said passage-way.

7. Apparatus for testing the condition of a metal object having a passage-way extending into the body thereof, which apparatus comprises a hollow handle member having openings in its wall, an electric lamp enclosed within said hollow handle member and mounted so that rays from said lamp when lighted are visible through said openings, a testing member carried by said handle member and adapted for insertion into said passage-way, a contact member mounted on the free end of said testing member and insulated therefrom, means combined with said contact member for inducing electric current and for generating a magnetic flux about said contact member, means for indicating variations in current induced, and means whereby an electric circuit through said lamp is completed when said contact member reaches and makes contact with the original closed end of said passage-way.

8. Apparatus for testing the condition of a metal object having a passage-way extending into the body thereof, which apparatus comprises a hollow handle member, a testing member carried by said handle member and adapted for insertion into said passage-way, a contact member mounted on the free end of said testing member and insulated therefrom, means combined with said contact member for inducing electric current and for generating a magnetic flux about said contact member, means mounted within said hollow handle member for indicating variations in current induced, additional indicating means mounted within said handle member, and means whereby an electric circuit through said latter indicator means is completed when said contact member reaches and makes contact with the original closed end of the said passage-way.

9. Apparatus for testing the condition of a metal object having a passage-way extending into the body thereof, which apparatus comprises a hollow handle member having openings in its wall, a plurality of electric lamps enclosed within said hollow handle member and each positioned so that rays from said lamps when lighted are visible through an opening, a testing member carried by said handle member and adapted for insertion into said passage-way, a contact member mounted on the free end of said testing member and insulated therefrom, means combined with said contact member for inducing electric current and for generating a magnetic flux about said contact member, means for conducting induced current, said latter means being electrically connected to one of said lamps, and means whereby an electric circuit through another of said lamps is completed when said contact member reaches and makes contact with the original closed end of said passage-way.

10. Apparatus for testing the condition of a metal object having a passage-way therein, including means adapted to be inserted into and moved along said passage-way for determining the presence or absence of fractures in said metal object, the said means comprising a single ferrous member, and opposed primary windings and secondary coil means on said member; and means for indicating variations in current in said secondary coil means.

11. Apparatus for testing the condition of a metal object having a passage-way therein, including means adapted to be inserted into and moved along said passageway for determining the presence or absence of fractures in said metal object, the said means comprising a single ferrous member having a core portion and a plurality of flanges extending laterally from said core portion forming a plurality of grooves for windings, and primary and secondary windings in said grooves; and means for indicating variations in current in said secondary winding.

12. Apparatus for testing the condition of a metal object having a passage-way therein, including means adapted to be inserted into and moved along said passage-way for determining the presence or absence of fractures in said metal object, the said means comprising a single ferrous member having a core portion and a plurality of flanges extending laterally from said core portion forming grooves, opposed primary windings in said grooves and nonopposed secondary windings in said grooves; and means for indicating variations in current in said secondary windings.

13. Apparatus for testing the condition of a metal object having a passage-way therein, including means adapted to be inserted into and moved along said passage-way for determining the presence or absence of fractures in said metal object, the said means comprising a single ferrous member having a core portion and a plurality of flanges extending laterally from said core portion forming grooves, opposed primary windings in two of said grooves, and secondary winding in an intermediate groove; and means for indicating variations in current in said secondary winding.

14. Apparatus for testing the condition of a metal object having a passage-way extending into the same, including means adapted to be inserted into and moved along said passage-way for determining the presence or absence of fractures in said metal object and for determining the presence or absence of nonconducting accumulations in said passage-way, the said means comprising a single ferrous member, and opposed primary windings and secondary coil means on said member; means for indicating variations in current in said secondary coil means, and means electrically connected to the said member for indicating whether it has reached the original closed end of said passage-way.

15. Apparatus associated with a telltale staybolt having a closure at its headed end, the said apparatus comprising means for movement along the telltale hole of the said telltale staybolt, magnetic flux generating means, means for indicating the presence or absence of fractures in the said staybolt from variations in the magnetic flux, and means for indicating whether the first named means has reached the original closed end of the said telltale hole.

16. Apparatus associated with a telltale staybolt for determining the condition thereof, the said apparatus comprising means adapted to be moved along the telltale hole of the said telltale staybolt for determining the presence or absence of fractures in the said telltale staybolt, the said means comprising a single ferrous member, and opposed primary windings and secondary coil means on said member; and means for indicating variations in current in said secondary coil means.

17. Apparatus associated with a telltale staybolt for determining the condition thereof, the said apparatus comprising means adapted to be moved along the telltale hole of the said telltale staybolt for determining the presence or absence of fractures in the said telltale staybolt, the said means comprising a single ferrous member having a core portion and a plurality of flanges extending laterally from said core portion forming a plurality of grooves for windings, and primary and secondary windings in said grooves; and means for indicating variations in current in said secondary winding.

18. Apparatus associated with a telltale staybolt for determining the condition thereof, the said apparatus comprising means adapted to be moved along the telltale hole of the said telltale staybolt for determining the presence or absence of fractures in the said telltale staybolt, the said means comprising a single ferrous member having a core portion and a plurality of flanges extending laterally from said core portion forming grooves, opposed primary windings in said grooves and nonopposed secondary windings in said grooves; and means for indicating variations in current in said secondary windings.

19. Apparatus associated with a telltale staybolt for determining the condition thereof, the said apparatus comprising means adapted to be moved along the telltale hole of the said telltale staybolt for determining the presence or absence of fractures in the said telltale staybolt, the said means comprising a single ferrous member having a core portion and a plurality of flanges extending laterally from said core portion forming grooves, opposed primary windings in two of said grooves, and a secondary winding in an intermediate groove; and means for indicating variations in current in said secondary winding.

20. Apparatus associated with a telltale staybolt having a closure at its headed end, the said apparatus comprising means for movement along the telltale hole of the said telltale staybolt for determining the presence or absence of fractures in the said staybolt and for determining the presence or absence of non-conducting accumulations in said telltale hole, the said means comprising a single ferrous member, and opposed primary windings and secondary coil means on said member; means for indicating variations in current in said secondary coil means, and means electrically connected to the said member for indicating whether it has reached the original closed end of said telltale hole.

21. In apparatus for testing boiler staybolts of the telltale type, a testing implement provided with means insertable in and freely movable along the telltale hole of a telltale staybolt while in place in a boiler, the said means including alternating magnetic flux generating means, means for minimizing the effect of induced current in the bolt, and means for indicating variations in the magnetic flux generated by the said flux generating means whereby a comparison is made between contiguous portions of the bolt in the field of the said flux generated within the telltale hole and in every breakable part of the bolt that renders it effective as a stay in a boiler and whereby the presence or absence of defects in the bolt are determined.

22. Apparatus for testing telltale staybolts, comprising a contact member constructed of magnetizable metal insertable into a telltale hole of a staybolt, the said member being associated with means in which current is adapted to be induced by a magnetic flux of alternating polarity, a current indicating means for current thus induced and adapted to indicate variations in the induced current, additional current indicating means electrically associated with the said contact member, and means whereby an electric circuit through the said additional indicating means is established when the said contact member touches the inner terminus of a telltale hole originally extending only part of the way through a bolt.

23. Apparatus for ascertaining the condition of boiler staybolts having a telltale hole, which apparatus comprises a contact member constructed of magnetizable metal supported at the end of non-magnetic metallic means adapted to be inserted into a telltale hole of a telltale staybolt, means associated with the said member in which latter means current is adapted to be induced, a current indicating means electrically connected to the said first-named means and adapted to indicate variations in current induced in the said first-named means, additional current indicating means electrically connected to the said contact member, and means including the said non-magnetic metallic means whereby an electric circuit through the said additional indicating means is established when the said contact member touches the inner terminus of a telltale hole originally extending only part of the way through a bolt.

24. Apparatus for testing boiler staybolts of the telltale type, which apparatus comprises a contact member constructed of magnetizable metal, a coil of insulated wire wound on the said contact member, the said contact member and coil being insertable into and movable in a telltale hole of a staybolt, a current indicating means electrically connected to the said coil and adapted to indicate variations in current induced in the said coil, additional current indicating means electrically connected to the said contact member, and means whereby an electric circuit through the said additional indicating means is established when the said contact member touches the inner terminus of a telltale hole originally extending only part of the way through a bolt.

25. Apparatus for testing staybolts of the telltale type, the said apparatus comprising a contact member constructed of magnetizable metal insertable into the telltale hole of a staybolt, means associated with the said contact member in which means current is adapted to be induced, a current indicating means electrically connected to the said first-named means and adapted to indicate variations in current induced in the said first-named means, an electric lamp adapted to be included in an electric circuit with the said contact member, and means whereby an electric circuit is established through the said lamp and the said contact member when the latter touches the inner terminus of a telltale hole originally extending only part of the way through a bolt.

26. Apparatus for testing telltale staybolts, which apparatus comprises a contact member adapted to be inserted into and moved in a telltale hole of a telltale staybolt, means associated with the said contact member for determining the presence or absence of fractures in any breakable part of a telltale staybolt, and means associated with the said contact member for determining the presence or absence of nonconducting accumulations in a telltale hole of a telltale staybolt.

27. Apparatus for testing telltale staybolts, which apparatus comprises a contact member adapted to be inserted into and moved in a telltale hole of a telltale staybolt, electrical means associated with the said contact member for determining the presence or absence of fractures in any breakable part of a telltale staybolt, and electrical means associated with the said contact member for determining the presence or absence of non-conducting accumulations in a telltale hole of a telltale staybolt.

28. Apparatus for testing bolts, comprising means highly permeable to magnetic lines of force; means, associated with the said first-named means, in which current is induced; current indicating means connected to the said second-named means, and separate indicating means electrically connected to said first-named means and to a source of current.

29. A testing instrument, comprising means for exploring a passageway in a magnetizable metal object, the said exploring means including means for determining the presence or absence of defects in the said object, and the said latter means for detecting said defects including means through which an electric current flows upon completion of a circuit for indicating the absence of non-conducting accumulations in the said passageway.

30. In apparatus for determining the condition of a telltale staybolt, the said apparatus including a single testing member having such shape and dimensions as to be insertable in the telltale hole of a staybolt and movable along the entire length of the said telltale hole while the said staybolt is in place in a boiler, electrical conductor means for conducting an electric current from the said testing means to current indicating means, means combined with the said testing member for generating a magnetic flux from within the said telltale hole whereby current is induced in the said conductor means when the said testing member is moved along the telltale hole while exploring the magnetic field in the said telltale hole, and current indicating means for indicating variations in the induced current whereby the presence or absence of defects in the staybolt is determined directly from the said staybolt under test and without comparison with another bolt.

31. In a method of testing a staybolt having a telltale hole extending into the body thereof, passing a magnetic flux of alternating polarity into the telltale staybolt from within the telltale hole, and while maintaining the said flux exploring the telltale hole with means in which current is adapted to be set up by induction, noting whether there is a variation in the current whereby the presence or absence of defects is determined directly from the staybolt tested and without comparison with another staybolt, and examining the telltale hole and noting by electrical indicating means the presence or absence of non-conducting accumulations in the telltale hole.

32. A method of testing a staybolt having a telltale hole extending into the body thereof, comprising passing a magnetic flux of alternating polarity into the telltale staybolt from within the telltale hole, and while maintaining the said flux exploring the telltale hole with means in which current is adapted to be set up by induction, and noting whether there is a variation in the current, thus set up in the said means while the said staybolt is in place and functioning as a stay, whereby the presence or absence of defects is determined directly from the staybolt tested and without comparison with another staybolt.

GROVER R. GREENSLADE.